(12) United States Patent
Fromer

(10) Patent No.: US 6,188,216 B1
(45) Date of Patent: Feb. 13, 2001

(54) LOW PROFILE NON-CONTACTING POSITION SENSOR

(75) Inventor: Eric E. Fromer, Elkhart, IN (US)

(73) Assignee: CTS Corporation, Elkhart, IN (US)

(*) Notice: Under 35 U.S.C. 154(b), the term of this patent shall be extended for 0 days.

(21) Appl. No.: 09/081,745

(22) Filed: May 18, 1998

(51) Int. Cl.[7] ....................................... G01B 7/14
(52) U.S. Cl. ................................. 324/207.2; 324/207.25
(58) Field of Search ........................... 324/207.2, 207.25, 324/208, 251, 207, 174, 173, 207.22; 340/671, 672; 73/514.39

(56) References Cited

U.S. PATENT DOCUMENTS

| | | |
|---|---|---|
| 3,112,464 | 11/1963 | Ratajski et al. . |
| 4,142,153 | 2/1979 | Smith . |
| 4,293,837 | 10/1981 | Jaffe et al. . |
| 4,570,118 * | 2/1986 | Tomczak et al. .................... 324/208 |
| 4,726,338 | 2/1988 | Decker et al. . |
| 4,744,343 | 5/1988 | Bisenius et al. . |
| 4,848,298 | 7/1989 | Schleupen . |
| 4,942,394 | 7/1990 | Gasiunas . |
| 5,055,781 | 10/1991 | Sakakibara et al. . |
| 5,115,239 | 5/1992 | Ushiyama . |
| 5,159,268 | 10/1992 | Wu . |
| 5,258,735 | 11/1993 | Allwine, Jr. . |
| 5,313,159 | 5/1994 | Allwine, Jr. . |
| 5,712,561 | 1/1998 | McCurley et al. . |
| 5,757,179 * | 5/1998 | McCurley et al. ................ 324/207.2 |

* cited by examiner

Primary Examiner—Christine Oda
Assistant Examiner—Anthony Jolly
(74) Attorney, Agent, or Firm—Mark P. Bourgeois; Mark W. Borgman

(57) ABSTRACT

A low profile non-contacting position sensor for rotational engagement with a shaft. A pole piece has a first and a second piece. A backstrap retains the first and second pieces in parallel and opposing relationship. A shaft passes through at least one of the pieces. The pole piece is held to the shaft by a shaft retainer. A first and second magnet is disposed on the first and second pieces, respectively. A magnetic sensor is positioned between the first and second magnets. A magnetic field sensor such as a hall effect sensor is positioned in an gap and operates to provide an output signal representative of the field strength of the magnet as the shaft rotates. The output signal changes magnitude in relation to the relative position of the magnet with respect to the magnetic field sensor.

2 Claims, 3 Drawing Sheets

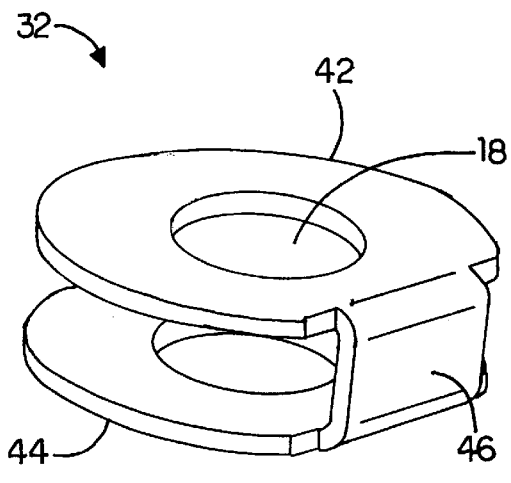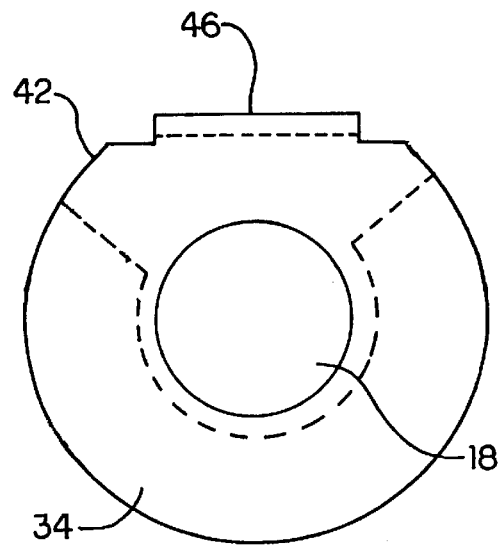
FIG. 4  FIG. 5
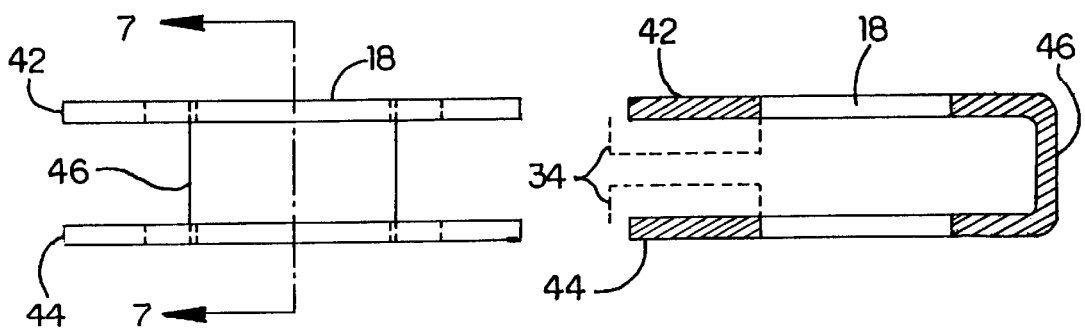
FIG. 6  FIG. 7

LOW PROFILE NON-CONTACTING POSITION SENSOR

BACKGROUND OF THE PREFERRED EMBODIMENT(S)

1. Field of the Preferred Embodiment(s)

This invention generally relates to position sensing and to a position sensor which is compact, durable and precise. More specifically, the invention relates to a noncontacting low profile position sensor.

2. Description of the Related Art

Position sensing is used to allow an electrical circuit to gain information about an event or a continuously varying condition. There are a variety of known techniques for angular position sensing. For example, optical, electrical, electrostatic, and magnetic fields are all used in a sensor to measure position. There are many known sensors such as resistive contacting networks, inductively coupled ratio sensors, variable reluctance devices, capacitively coupled ratio detectors, optical detectors using the Faraday effect, photo-activated ratio detectors, and electrostatic ratio detectors.

There are many applications for sensors, and a wide variety of technologies to fill these needs. Each of these technologies offers a unique set of advantages and limitations. limitations. Of these technologies, magnetic sensing is known to have a unique combination of long life components and excellent resistance to contaminants.

Regardless of the arrangement and method for changing the field about the sensor, the magnetic circuit faces several obstacles which have not been overcome. Movement of the sensor relative to the gap as a result of bearing play will lead to a variation in field strength measured by the sensor. This effect is particularly pronounced in Hall effect, magneto-resistive and other similar sensors, where the sensor is sensitive about a single axis and insensitive to perpendicular magnetic fields.

DESCRIPTION OF RELATED ART

Examples of patents related to the present invention are as follows, wherein each patent is herein incorporated by reference for related and supporting teachings:

U.S. Pat. No. 3,112,464 is a hall effect translating device.

U.S. Pat. No. 4,142,153 is a tachometer for measuring speed and direction of shaft rotation with a single sensing element.

U.S. Pat. No. 4,293,837 is a hall effect potentiometer.

U.S. Pat. No. 4,570,118, is an angular position transducer including permanent magnets and hall effect device.

U.S. Pat. No. 4,726,338 is a device for controlling internal combustion engines.

U.S. Pat. No. 4,744,343 is a device for controlling an internal combustion engine.

U.S. Pat. No. 4,848,298 is a device for controlling internal combustion engine.

U.S. Pat. No. 4,942,394 is a hall effect encoder apparatus

U.S. Pat. No. 5,055,781, is a rotational angle detecting sensor having a plurality of magnetoresistive elements located in a uniform magnetic field.

U.S. Pat. No. 5,115,239 is a magnetic absolute position encoder with an undulating track.

U.S. Pat. No. 5,159,268 is a rotational position sensor with a hall effect device and shaped magnet.

U.S. Pat. No. 5,258,735 is a multi-pole composite magnet used in a magnetic encoder.

U.S. Pat. No. 5,313,159 is a magnetic encoder with composite magnet.

U.S. Pat. No. 5,712,561 is a field strength position sensor with improved bearing tolerance in a reduced space.

U.S. patent application Ser. No. 08/206982 titled, "dual magnet hall effect position sensor", filed Mar. 4, 1994 and owned by the same assignee as the instant application.

U.S. patent application Ser. No. 08/206474 titled, "molded magnet structure", filed Mar. 4, 1994 and owned by the same assignee as the instant application.

U.S. patent application Ser. No. 08/976879 titled, "molded magnet structure", filed Nov. 24, 1997 and owned by the same assignee as the instant application.

U.S. patent application Ser. No. 08/206568 titled, "flux gradient control", filed Mar. 4, 1994 and owned by the same assignee as the instant application.

U.S. patent application Ser. No. 08/659963 titled, "field strength position sensor with improved bearing", filed Jun. 7, 1996 and owned by the same assignee as the instant application.

U.S. patent application Ser. No. 08/971800 titled, "flux gradient control", filed Nov. 17, 1997 and owned by the same assignee as the instant application.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicants' claimed invention.

PROBLEMS WITH THE PRIOR ART

There are several problems that exist with the prior art that are addressed by the preferred embodiment. One problem with the prior art sensors is that they are too thick and are unable to fit into some engine locations. Engine compartments are becoming more cramped due to more engine functions being added. Another cause of engine room space shortage is the trend toward maximizing the interior space of the car while keeping the overall dimensions of the car the same. This leads to a shrinking of the engine compartment.

Another problem is that the prior art throttle position sensors have had to have a shorter input shaft that can not extend through or beyond the device. In some applications, it is preferable to have a longer shaft.

This and other problems will be solved by the preferred embodiments of the invention. A review of the specification, drawings, and claims will more clearly teach a skilled artisan of other problems that are solved by the preferred embodiments.

SUMMARY OF THE PREFERRED EMBODIMENT(S)

It is a feature of the invention to provide a position sensor for rotational engagement with a shaft. The sensor includes a pole piece, having a first and second piece, a backstrap for retaining the first and second pieces in parallel and opposing relationship, and a bore extending through at least one of the pieces for the shaft to be inserted therein. A first and second magnet is disposed on the first and second pieces respectively. A magnetic sensor is positioned between the first and second magnets.

A magnetic field varies from a first to a second location on the magnets and extends across the air gap. The magnetic field sensor is positioned in the air gap and operates to provide an output signal representative of the variable magnetic field as the pole piece is rotated. The output signal changes magnitude in relation to the relative position of the magnet with respect to the magnetic field sensor.

It is a feature of the invention to provide a first and second magnetically permeable devices with a first and second aperture or bore, respectively. The shaft passes through at least one of the first or second apertures or bore.

A further feature of the invention is to provide the magnetically permeable device to be held to the shaft by a shaft retainer.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

BRIEF DESCRIPTION OF THE DRAWINGS

These and other features of the invention can best be understood by the following description of the accompanying drawings as follows:

FIG. 1 is a perspective view of the low profile non-contacting position sensor with the housing cover on.

FIG. 4 is a perspective view of a pole piece of the position sensor of FIG. 1.

FIG. 5 is a top view of the pole piece of FIG. 3.

FIG. 6 is a side view of the pole piece of FIG. 3.

FIG. 7 is a cross-sectional view along line A—A of FIG. 6.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
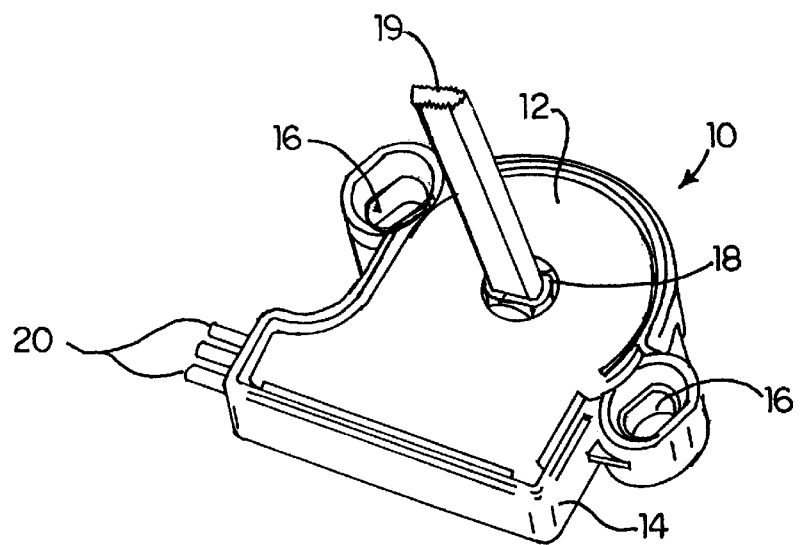

Referring to FIG. 1, there is a perspective view of the low profile non-contacting position sensor 10 with the housing cover 12 in place. A housing 14 contains the sensor components. A pair of mounting holes 16 fasten the sensor 10 to another structural support such as an engine or a motor frame. A shaft aperture or bore 18 allows a rotating shaft 19 to extend into and through the sensor housing 14. Several connector terminals 20 allow the sensor 10 to be connected with a wiring harness (not shown) or other external wiring (not shown).

Figure 2:
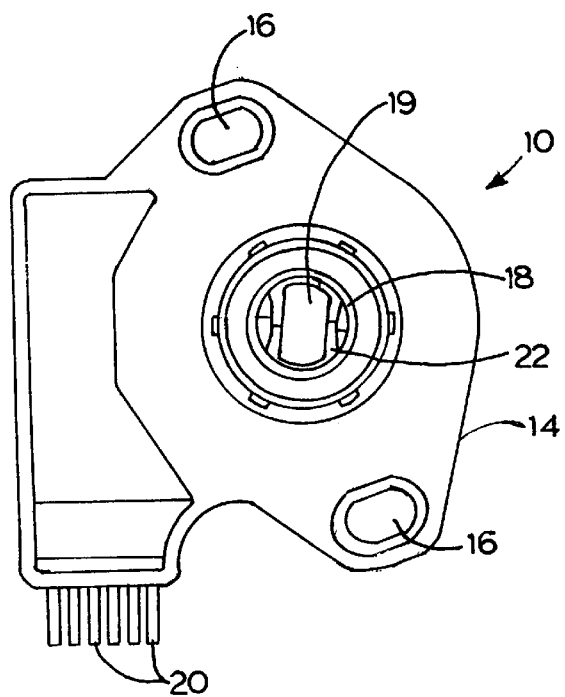
FIG. 2 is a bottom view of the position sensor of FIG. 1.

Referring to FIG. 2, a bottom view of the position sensor of FIG. 1 is shown. A shaft retainer 22 is located in the center of the sensor 10. The shaft retainer 22 holds the shaft 19 of a rotating object and transfers the rotational movement of the shaft 19 to the sensor 10.

Figure 3:
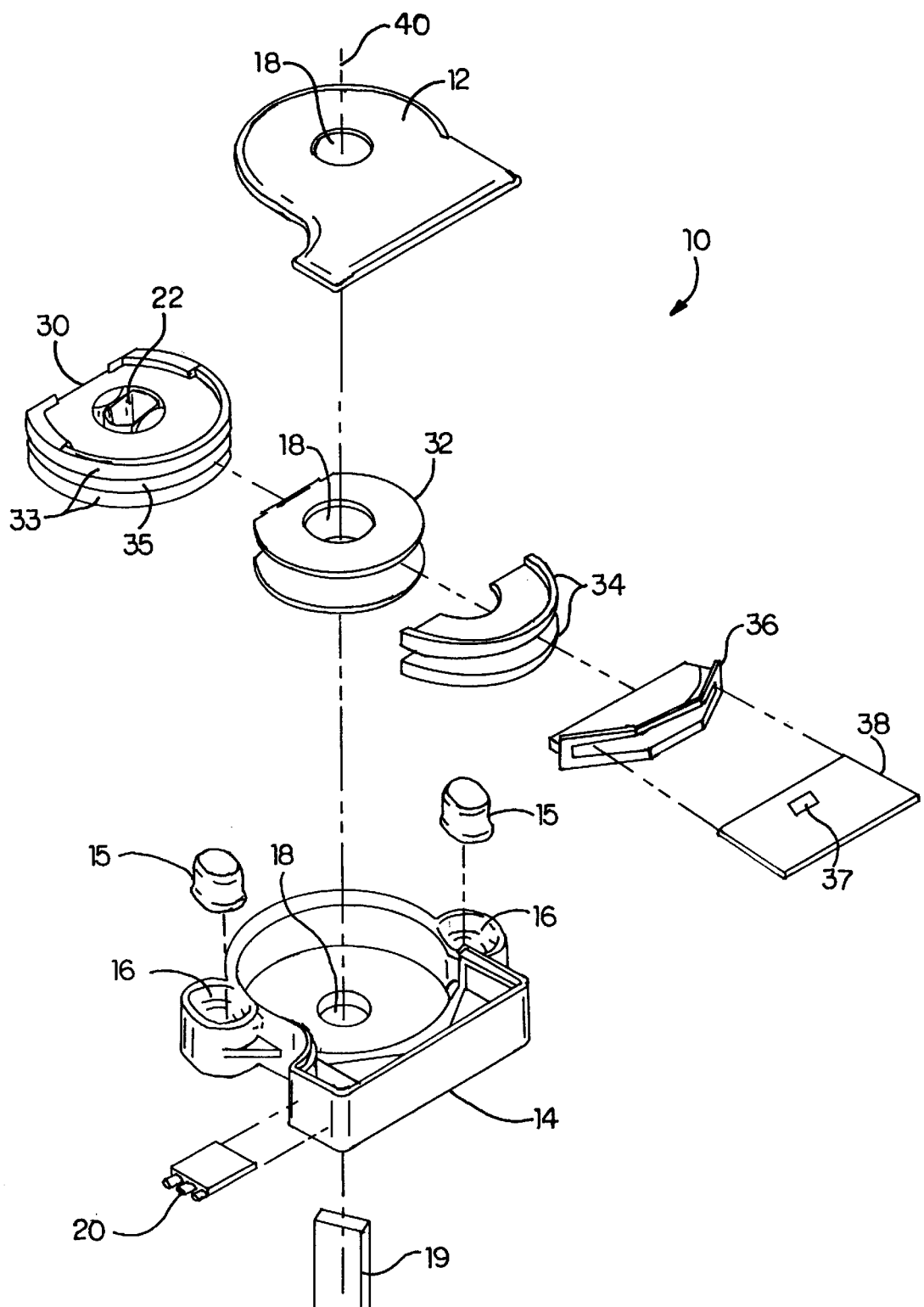
FIG. 3 is a exploded view of the position sensor of FIG. 1.

FIG. 3 shows an exploded view of the position sensor 10. Specifically, there is a pole assembly 30 which is made up of a circular pole piece 32 to which a pair of semicircular magnets 34 are attached. The magnets 34 vary in width along their circumference. The magnets 34 are preferably formed out of conventional ferrite. An encapsulant 33 is applied over the magnets 34 after they are attached to the pole piece 32. The shaft retainer 22 is molded onto the pole piece 32. A circuit board holder 36 holds a circuit board 38. The circuit board has mounted on it a magnetic field sensor 37 and its associated circuitry. The magnetic field sensor 37 is typically a conventional hall effect sensor. An air gap 35 is shown located between the magnets 34. The magnetic field sensor 37 is mounted in the air gap 35. An electrical connection (not shown) connects the circuit board 38 to the connector terminals 20. The shaft 19 is adapted to be inserted through the shaft aperture 18 and held by the shaft retainer 22. The shaft 19 and pole assembly 30 rotate about an axis of rotation 40. A pair of inserts 15 are located within the mounting hole 16.

The assembly of the position sensor 10 is as follows: The magnets 34 are attached by molding or gluing to pole piece 32 which is then overmolded with a plastic encapsulant 33 forming pole assembly 30. The shaft retainer 22 is part of the overmolded plastic encapsulant 33. Next, the circuit board holder 36 is inserted into the pole assembly 30 and then the circuit board 38 is inserted into the circuit board holder 36. The connector terminals 20 are inserted into housing 14. The pole assembly 30, the circuit board holder 36 and the circuit board 38 are placed in the housing 14. The connector terminals 20 are electrically connected to the circuit board 38. The inserts 15 are molded into the mounting holes 16. The cover 12 is placed over the housing 14 to complete the assembly.

FIG. 4 shows a perspective view of the pole piece 32. Pole piece 32 has an upper piece or disc 42 and a lower piece or disc 44 connected together by a backstrap 46. The backstrap 46 magnetically couples the upper disc 42 and the lower disc 44 to complete a closed magnetic flux path. The pole piece 32 can be stamped out of a single piece or welded together from several pieces. The upper disc 42 is positioned spaced parallel to and opposed from lower disc 44. The shaft aperture 18 passes completely through the upper and lower discs 42 and 44, respectively. The pole piece 32 is preferably formed out of a ferromagnetic stainless steel such as 401 stainless. The discs 42 and 44 are formed of a uniform thickness.

Referring to FIG. 5, a top view of the pole piece 32 is shown. The magnets 34 are shown in dotted line attached to the pole piece 32. FIG. 6 shows a side view of the pole piece 32. FIG. 7 shows a cross-sectional view along line 7—7 of FIG. 6 of the pole piece 32. The magnets 34 are seen in dotted line section.

OPERATION OF THE PREFERRED EMBODIMENT

The operation of the low profile position sensor is described next. As the shaft 19 rotates and is driven by the rotating object whose position is desired to be sensed, the magnets 34 will be rotationally moved relative to the magnetic sensor 37 mounted on the circuit board 38. A closed magnetic path exists when flux generated is confined within a high permeability material. The flux path from magnets 34 primarily flows from the lower magnet 34, through the air gap 35, through upper magnet 34, through upper disc 42, through backstrap 46, and through lower disc 44 completing the path. It is understood that there are magnetic losses in any magnetic path from fringing flux and other loss sources. As the magnets 34 rotate, the magnetic field strength sensed by the magnetic sensor will change due to the changing thickness of the magnets 34. When the magnet narrow region is positioned near magnetic sensor 37, the magnetic field will have a relatively low intensity and the output from the magnetic sensor 37 will be low. As the magnets 34 rotate, a thicker portion of the magnets 34 is located near the magnetic sensor 37 and the magnetic field strength increases proportionally.

The semicircular magnets shown here are able to sense about 200 degrees of rotation. The circuit board 38 contains circuitry that is able to condition the output of the hall sensor and to supply an output signal. The circuit board 38 also has circuitry that compensates for changes in temperature. When the shaft 19 is inserted into the pole assembly 30 and if the shaft is fabricated out of a magnetically permeable material such as steel, the shaft will alter the magnetic flux path in the assembly. The effect of the shaft 19 on the flux path can be taken into account and compensated for in the design of the magnets 34. Alternatively, the position sensor will also work if the shaft 19 is fabricated out of a non-magnetically permeable material such as plastic or aluminum.

REMARKS ABOUT THE PREFERRED EMBODIMENT

One of ordinary skill in the arts of sensors, and more particularly the art of designing non-contacting position sensors, will realize many advantages from using the preferred embodiment. In particular, the low profile non-contacting position sensor assembly allows the sensor to have a thin profile which can be fit into a crowded engine compartment because, the shaft aperture 18 and the shaft retainer 22 allow the rotating shaft 19 to pass into and partially be contained by the position sensor 10 resulting in a thin overall profile of the position sensor 10.

The design of the backstrap 46 is critical to the operation of the position sensor 10. The backstrap 46 must be positioned at a radius on the upper and lower discs 42 and 44 such that the width of the backstrap has sufficient material to contain the flux density and at the same time must not be positioned to close to the shaft passing through the shaft aperture 18 because it would limit the rotation of the pole assembly 30. A preferred location for the backstrap is between ⅕ and ⅘ of the radius of the upper and lower discs 42 and 44, respectively.

VARIATIONS OF THE PREFERRED EMBODIMENT(S)

One of ordinary skill in the art of making position sensors will realize that there are many different ways of accomplishing the preferred embodiment. For example, it is contemplated to make the housing 14, out of any suitable material, like plastics, epoxy resin, fiberglass etc. Additionally, the pole assembly 30 could be made out of any magnetically permeable material such as cast iron. The magnets 34 and upper and lower discs 42 and 44 that make up pole assembly 30 could be fastened by other methods such as glue, press fitting, welding etc.

Even though, the embodiment discusses the use of two magnets 34, it is contemplated to use only one magnet on one of the discs. Either the upper or lower disc 42 or 44 could contain a single magnet 34.

Similarly, even though the embodiment discusses the use of a Barium Ferrite magnets 34, one skilled in the art of magnet design would realize that a Samarium-Cobalt magnets could also be used. It is also possible to make the shape of the magnets 34 differently. For example, the magnets 34 could be made narrower or wider than what is shown. The magnets 34 also could be formed from several small magnets that are arrayed having an increasing or decreasing thickness.

Although, the shaft 19 is described as passing completely through the pole piece 32 including the upper and lower discs 42 and 44, it is contemplated that only one of the discs 42 or 44 have a shaft aperture 18.

Additionally, the shaft could pass through and extend well beyond the sensor 10.

The position sensors 10 could be placed at multiple locations on the same shaft.

Additionally, although it is illustrated that the shaft retainer 22 is molded to the pole assembly 30, it is contemplated to fasten the shaft to the pole assembly 30 by other suitable fastening means such as a key, splined shaft, cotter pin, snap ring, welding, etc.

The magnetic sensor 37 shown in the preferred embodiment was a hall effect sensor. It is contemplated that two or more magnetic sensors 37 could be utilized and that other types of magnetic sensors could be utilized such as variable reluctance sensors or other types of magnetic sensors.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by Letters Patent is:

1. A rotary position sensor engagable with a rectangular shaft, comprising:
   a) a magnetically permeable pole assembly having a bore therethrough for allowing the shaft to removably extend through the pole assembly, the pole assembly having a shaft retainer attached in the bore, the shaft slideable into the shaft retainer in order to rotate the pole assembly, the pole assembly including:
      a1) a first and second disc spaced apart by a backstrap, the backstrap disposed between the first and second discs for magnetically coupling the first and second discs, the bore extending through the first and second discs, an air gap formed between the first and second discs;
   b) a pair of magnets attached to the first and second discs along either side of the air gap and being magnetically coupled to provide a closed magnetic path between the pole assembly and the magnets, the magnets having a varying thickness about a circumference, the magnets providing a variable magnetic field about the circumference; and
   c) a magnetic field sensor positioned in the air gap and operable to provide an output signal representative of the variable magnetic field as the pole assembly is rotated, the output signal changing magnitude in relation to the relative position of the magnet with respect to the magnetic field sensor.

2. The position sensor according to claim 1, wherein the backstrap is offset from an axis of rotation.

* * * * *